US008108410B2

(12) United States Patent
Strosaker et al.

(10) Patent No.: US 8,108,410 B2
(45) Date of Patent: Jan. 31, 2012

(54) DETERMINING VERACITY OF DATA IN A REPOSITORY USING A SEMANTIC NETWORK

(75) Inventors: Ann Margaret Strosaker, Austin, TX (US); Michael Thomas Strosaker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 12/186,634

(22) Filed: Aug. 6, 2008

(65) Prior Publication Data
US 2008/0294610 A1 Nov. 27, 2008

Related U.S. Application Data

(63) Continuation-in-part of application No. 11/539,753, filed on Oct. 9, 2006, now abandoned.

(51) Int. Cl.
*G06F 17/30* (2006.01)
(52) U.S. Cl. ...................................................... 707/750
(58) Field of Classification Search .................. 707/730, 707/706, 707, 749, 750
See application file for complete search history.

(56) References Cited

U.S. PATENT DOCUMENTS

| | | | | |
|---|---|---|---|---|
| 6,088,707 | A * | 7/2000 | Bates et al. | 715/235 |
| 6,094,657 | A * | 7/2000 | Hailpern et al. | 707/740 |
| 6,242,013 | B1 | 6/2001 | Luhman et al. | |
| 6,253,198 | B1 | 6/2001 | Perkins | |
| 6,636,848 | B1 | 10/2003 | Aridor et al. | |
| 6,778,970 | B2 * | 8/2004 | Au | 706/55 |
| 7,003,513 | B2 * | 2/2006 | Geiselhart | 1/1 |
| 2003/0220913 | A1 * | 11/2003 | Doganata et al. | 707/3 |
| 2003/0220915 | A1 * | 11/2003 | Fagan et al. | 707/3 |
| 2003/0225747 | A1 | 12/2003 | Brown et al. | |
| 2004/0019588 | A1 | 1/2004 | Doganata et al. | |
| 2004/0052414 | A1 * | 3/2004 | Schroder | 382/167 |
| 2004/0122816 | A1 | 6/2004 | Kirkland et al. | |

(Continued)

FOREIGN PATENT DOCUMENTS
EP 0597630 A1 5/1994
(Continued)

OTHER PUBLICATIONS

Wecker "Organizing a Ranked List of Search Matches", IBM technical Disclosure Bulletin, vol. 37, No. 11, Nov. 1994, pp. 117-120.

(Continued)

*Primary Examiner* — Angela Lie
*Assistant Examiner* — Fatima Mina
(74) *Attorney, Agent, or Firm* — Matthew W. Baca

(57) ABSTRACT

A mechanism for determining the veracity of data in a repository. Responsive to receiving a search query from a user, a semantic network is created from the documents in the repository. A determination is made as to whether data from a first document in the semantic network conflicts with data from a second document in the semantic network. If a conflict exists, a determination is made as to whether the data from the first document is obsolete in comparison to data from the second document. If the data from the first document is obsolete in comparison to data from the second document, a portion of the first document corresponding to the obsolete data is automatically annotating with the data from the second document to form an annotated first document. A search result list is then provided to the user comprising the second document and the annotated first document.

15 Claims, 9 Drawing Sheets

U.S. PATENT DOCUMENTS

| | | |
|---|---|---|
| 2005/0192955 A1 | 9/2005 | Farrell |
| 2005/0210008 A1* | 9/2005 | Tran et al. ............ 707/3 |
| 2006/0167930 A1 | 7/2006 | Witwer et al. |
| 2006/0190278 A1* | 8/2006 | Zimmerman et al. ........ 705/1 |
| 2006/0206476 A1 | 9/2006 | Kapur et al. |
| 2006/0242013 A1 | 10/2006 | Agarwal et al. |
| 2006/0242147 A1 | 10/2006 | Gehrking et al. |

FOREIGN PATENT DOCUMENTS

| | | |
|---|---|---|
| EP | 1288794 A1 | 3/2003 |

OTHER PUBLICATIONS

"Google Toolbar's Autolink & The Need for Opt-Out", Feb. 25, 2005, pp. 1-6. http://blog.searchenginewatch.com/blog/050225-104317.

"Annotea Project", retrieved Jul. 24, 2008, pp. 1-3. http://www.w3.org/2001/Annotea/.

"ThirdVoice—Contextual-Search Browser Add-On", Jul. 27, 2000, pp. 1-5. http://www.masternewmedia.org/2000/07/27/thirdvoice_contextualsearch_browser_addon.htm.

* cited by examiner

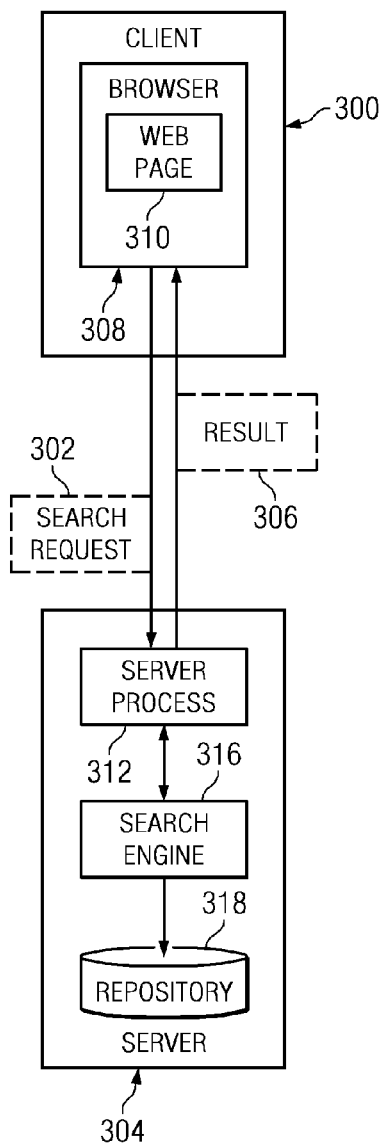
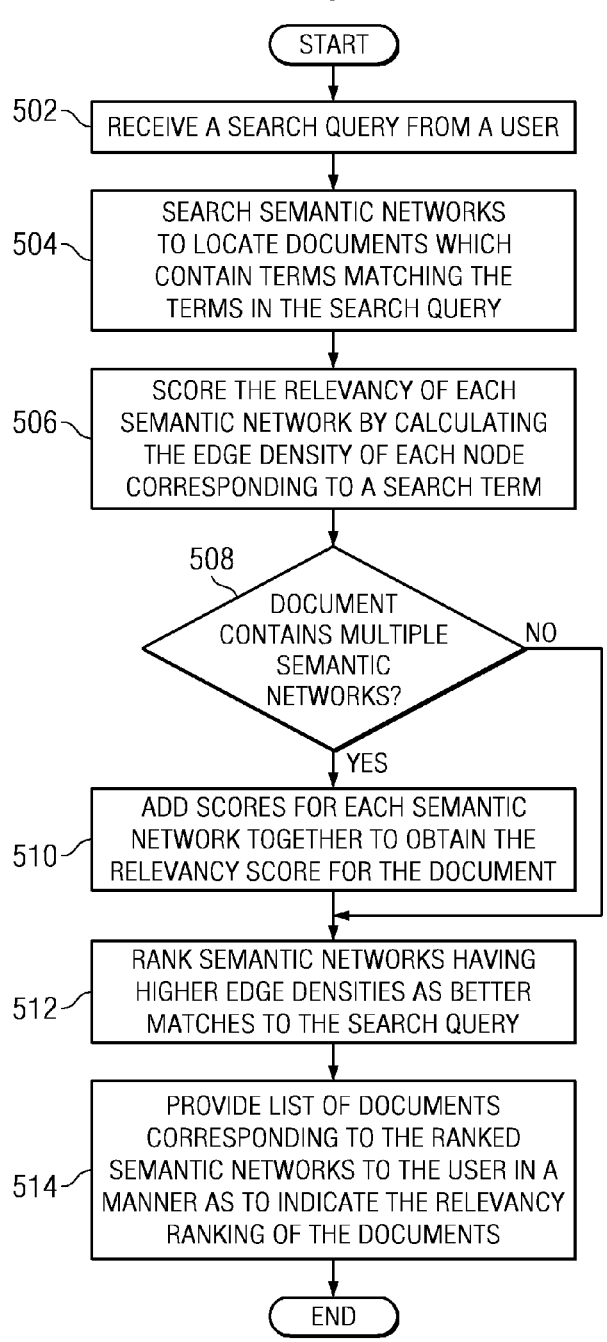

DETERMINING VERACITY OF DATA IN A REPOSITORY USING A SEMANTIC NETWORK

This application is a continuation-in-part of application Ser. No. 11/539,753, filed Oct. 9, 2006, status pending.

BACKGROUND OF THE INVENTION

1. Field of the Invention

The present invention relates generally to an improved data processing system, and in particular, to determining the veracity of data in a repository using a semantic network.

2. Description of the Related Art

The Internet is a globally accessible network of computers that collectively provide a large amount and variety of information to users. From services of the Internet such as the World Wide Web (or simply, the "web"), users may retrieve or "download" data from Internet network sites and display the data that includes information presented as text in various fonts, graphics, images, and the like having an appearance intended by the publisher. As the information revolution has exploded, more and more information is available through the Internet. However, finding particular pieces of information out of the millions of "web sites" available can be daunting.

One way of sorting through this mass of information to find what is of interest for a particular user is through the use of "search engines". Search engines are software written to search, among the millions of web sites or large document repositories, for certain key words or search criteria entered by a user, and to return to the user a list of links (such as references to other HTML pages) to the sites or documents that the search engine determines to be most relevant to the criteria entered by the user. Different search engines use different methods of determining the relevance of the web sites or documents, but most use some sort of quantitative method that determines the relevance of a site or document based on how many times the search words entered by the user appear within that particular site or document.

Search engines typically return only a list of links of sites or documents which contain one or more references to the search terms entered by the user. Often times, this list does not necessarily contain sites or documents that are actually relevant to a search query. A user may have difficulty in finding a site or document that is actually relevant to the search query since existing search engines classify web pages and documents based on raw statistical analysis of the words in a page. This raw statistical analysis technique is often called the "bag of words" model. Using the "bag of words" model, existing search engines do not take into consideration the meaning of the words, or the significance of the relationships between concepts. While such existing search models are adequate for merely locating web sites or documents which contain one or more terms in a user's search query, these search models lack the ability to determine which of the documents located is most relevant to the search query.

In addition, search engines typically return data that is largely based on keyword matches and algorithms, and have no concern as to whether a document (or part of a document) contains out-of-date information. For example, if a geographic area that was previously represented by the ZIP code 11111 has been divided by the postal service into two smaller areas represented by ZIP code 11111 and new ZIP code 22222, the postal service will assign an address that is now located in the new area code the new ZIP code 22222. However, if the address (now located in the new area code) appears in multiple places on the web, searches for the address will likely result in web pages that contain the out-of-date ZIP code information 11111, as the owner of the address may not have the ability to update all occurrences of the address with the new ZIP code information.

BRIEF SUMMARY OF THE INVENTION

The illustrative embodiments provide a computer implemented method, data processing system, and computer program product for determining the veracity of data in a repository. Responsive to receiving a search query from a user, a semantic network is created from the documents in the repository. A determination is made as to whether data from a first document in the semantic network conflicts with data from a second document in the semantic network. Responsive to a determination that a conflict exists between data from the first document and data from the second document, a determination is made as to whether the data from the first document is obsolete in comparison to data from the second document. If the data from the first document is obsolete in comparison to data from the second document, a portion of the first document corresponding to the obsolete data is automatically annotated with the data from the second document to form an annotated first document. A search result list is then provided to the user comprising the second document and the annotated first document.

BRIEF DESCRIPTION OF THE SEVERAL VIEWS OF THE DRAWINGS

FIG. 3 is a block diagram of exemplary components with which the illustrative embodiments may be implemented;

FIG. 5 is a flowchart of a process for establishing document relevance by semantic network density in accordance with the illustrative embodiments;

DETAILED DESCRIPTION OF THE INVENTION

Figure 1:
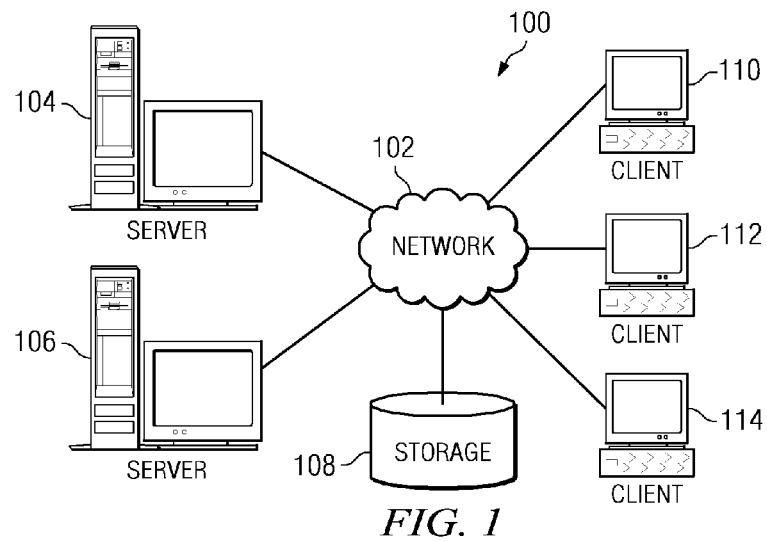
FIG. 1 depicts a pictorial representation of a distributed data processing system in which the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
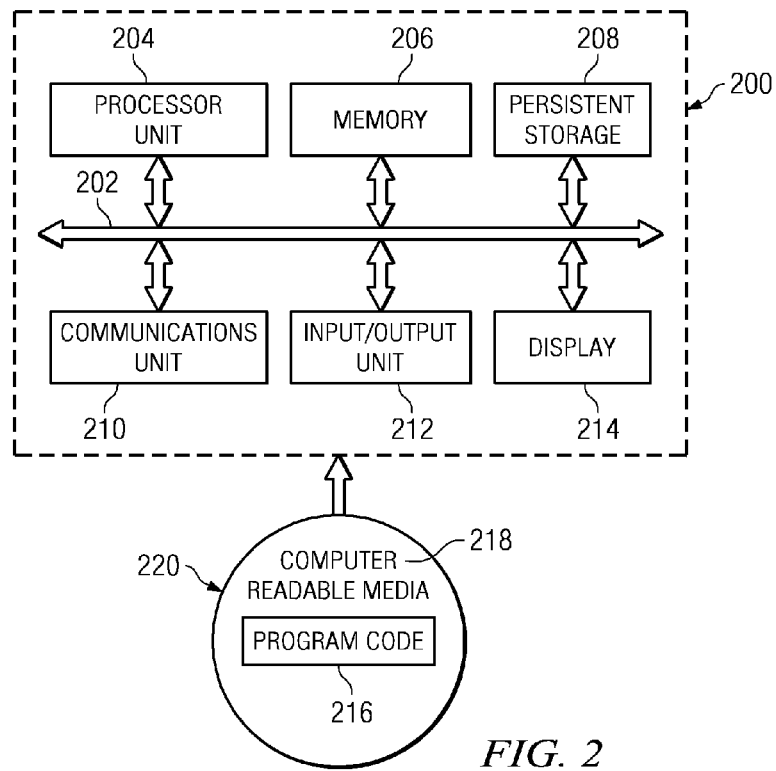
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As previously mentioned, there are several known traditional search algorithms in the existing art which return, based on search terms entered by a user, a list of documents which contain one or more references to the search terms in the user's query. One of these traditional search algorithms is the "bag of words" model, which classifies documents based on a raw statistical analysis of the number of search terms in the page. While these traditional search algorithms may return a list of matching documents which contain one or more of the search terms in the query, these traditional algorithms do not necessarily allow for locating a document that is actually relevant to the search, for they do not take into consideration the meaning of the words or the relationships between them. The illustrative embodiments address this issue by providing a relevancy algorithm for determining how relevant a matching document is to the terms in the search query. A list of matching documents (i.e., documents containing one or more of the search terms) may be obtained using any of the traditional search algorithms in the art. Once the list of documents that contain a match to one or more search terms in the query is obtained, the relevancy algorithm described in the illustrative embodiments may be used to determine the relevancy of the matching documents to the search terms.

Prior to receiving a search query, a repository of documents is indexed for search. During the indexing, one or more semantic networks are generated for each document in the repository. Any known method of generating semantic networks may be used to implement the illustrative embodiments. A semantic network is a diagram that represents concepts that are specified in the document, as well as the relationships between the concepts. A concept may be an idea or thought that has meaning. The semantic network comprises nodes which represent the concepts, and edges which represent the semantic relations between the concepts. The generated semantic networks may be stored with the index in the repository.

The relevancy algorithm for scoring each matching document may include a search of all of the semantic networks in the repository to locate those networks which have one or more terms which match the terms in the search query. When a search query is received from a user, the relevancy algorithm first searches the semantic networks for documents containing terms which match the terms in the search query. This search for matching networks may also be performed using traditional algorithms, such as "bag of words" matching and enumeration of referring documents. Regardless of the manner of obtaining a list of documents which contain terms matching the search query, the relevancy algorithm is then used to rank those matching documents according to each document's relevancy to the search terms. The relevancy algorithm ranks the matching networks for the documents in the list by first determining which of the semantic networks have a higher edge density around the nodes which correspond to the search terms. The edge density for a node is simply the number of edges (i.e., relationship connections) incident to the relevant node (i.e., concept). The relevancy algorithm scores each matching semantic network based on the total number of edges in the network multiplied by the total number of matching terms in the network. If a document contains multiple matching semantic networks, the scores for each or the matching semantic networks are added together. Semantic networks having a higher edge density score are ranked as being a better match to the search query. Thus, documents that have a significant amount of context around the term(s) of interest are more likely to be relevant to the query.

The relevancy algorithm described in the illustrative embodiments provides an improvement over traditional search algorithms which determine the relevancy of a document only by the quantity of the search terms in the document and/or number of referring documents. The relevancy algorithm technique also overcomes the storage problems typically associated with semantic networks. A disadvantage of using semantic networks is the exorbitant storage requirements for storing an entire semantic network, as opposed to traditional search algorithms such as the "bag of words" model which only require one to store a list of keywords, as well as possibly storing the number of occurrences of each keyword. However, the relevancy algorithm technique in the illustrative embodiments mitigates the semantic network storage requirement by only storing the list of keywords and the number of edges incident to each keyword. For instance, when the documents are indexed as described above, the list of keywords along with the number of incident edges for each keyword are stored, rather than the entirety of the semantic network. Thus, the amount of additional storage required to implement the relevancy algorithm technique is only negligibly greater (if at all) than the storage requirements of traditional search algorithms.

In addition, as previously mentioned, existing search engines typically return data that is largely based on keyword matches and algorithms, and have no concern as to whether a document (or part of a document) contains out-of-date information. Consider the example of a corporation that heavily markets a new product on the web, indicating that the product will be released to the public on July $1^{st}$. A number of Internet-based technical journals and weblogs discuss the upcoming product in depth and mention the release date. Unfortunately, the corporation experiences problems with the product and decides to delay the product release. The corporation updates its website, which now specifies a new release date of Sep. $15^{th}$. However, users who subsequently perform searches for the product will receive a list of search results comprising articles and blog entries that still contain the original ship date. The illustrative embodiments address this issue by providing an annotation mechanism which identifies obsolete data within documents stored in a repository, such as the web or a private database. Once obsolete data in a document is identified, the annotation mechanism then automatically annotates the obsolete data in the document to indicate that at least a portion of the data in the web page is out-of-date, as well as to display up-to-date data obtained from the repository on the document.

With the annotation mechanism in the illustrative embodiments, a repository of documents is indexed for search. During the indexing, one or more semantic networks are generated for each document in the repository, depending upon the variety of content in the document. For example, if the document discusses two completely different topics, there may be no common nodes between the two topics, and thus there would be no links between the networks representing the disparate topics in the document. In this situation, two semantic networks may be created for one document. In contrast, a single semantic network may also encompass multiple documents (or parts of documents) which discuss the same or similar topics.

As previously mentioned, any known method of generating semantic networks may be used to implement the illustrative embodiments. By converting the data into a semantic network, the data in a document may be broken down into component propositions, which makes it easier to identify a part of a document as obsolete, while allowing the remaining portions of the document to be considered still up-to-date. The mechanism of the illustrative embodiments uses semantic networks to determine the veracity of the data in the repository. A "trustworthiness" algorithm may be used to identify conflicts between propositions in the semantic network, and thus which of the conflicting propositions comprises data that is no longer useful or obsolete. To determine which conflicting proposition comprises data that is no longer useful or obsolete, the trustworthiness algorithm may compare the age of the data against the age of the other proposition (i.e., the date and time the data was created or updated), determine whether the data is superseded by more recent data in the other proposition, compare the frequency of searches for the proposition against the other proposition, etc.

Once a document in the repository has been identified as containing obsolete data by the trustworthiness algorithm, the annotation mechanism automatically annotates the identified obsolete data in the document with the data in the conflicting proposition that is determined to be more accurate and up-to-date. For example, a document in the repository having a more recent creation or publish date may be considered to contain more accurate data than an older document containing a conflicting proposition. Consequently, the data in the more recent document will be used to override the conflicting proposition in an older document. Thus, using the previous example, a search of the product will still return a result list comprising the journal and blog documents having the out-of-date information. However, due to the presence of superseding data (e.g., the more recent document containing the new release date in the repository), when a user clicks on either the journal and blog document, the obsolete original release date is annotated in the document with the data from the newer document to indicate and specify the new release date.

Turning next to FIG. 3, a diagram illustrating components used in generating and performing a search is depicted in accordance with the illustrative embodiments of the present invention. In this example, client 300 sends search request 302 to server 304 and receives result 306. Client 300 or server 304 may be implemented using data processing system 200 in FIG. 2.

In this particular web-based search example, browser 308 is an application executing on client 300. Web page 310 is currently displayed in browser 308. When the user enters search criteria into web page 310, the search criteria is sent in search request 302, which is received by server process 312 in server 304.

Server process 312 processes search request 302 and sends the search terms to search engine 316, which performs a search using repository 318 to identify sources of information related to the search terms. Repository 318 contains an index used to search documents stored within. This index also contains mappings to different web pages or other types of content that may be searched based on the search terms. These mappings may be static or may change over time. Search engine 316 may be implemented using various well-known search engines. Some search engines which may be used include, for example, AltaVista, Google, and HotBot. Depending on the particular implementation, search engine 316 may be located on a different data processing system than server process 312.

Search engine 316 generates semantic networks for repository 318. A document or web page may contain one or more semantic networks. The semantic networks may be stored with the index in repository 318. In one example, all of the terms in the semantic networks may be stored within a symbol table to allow the search engine to easily locate the nodes corresponding to the search terms.

The results of the search query are sent to server process 312 for return to client 300 in result 306. Result 306 may be, for example, a particular web page containing the information related to the search terms or a web page containing links to web pages satisfying the search criteria.

Figure 4A:
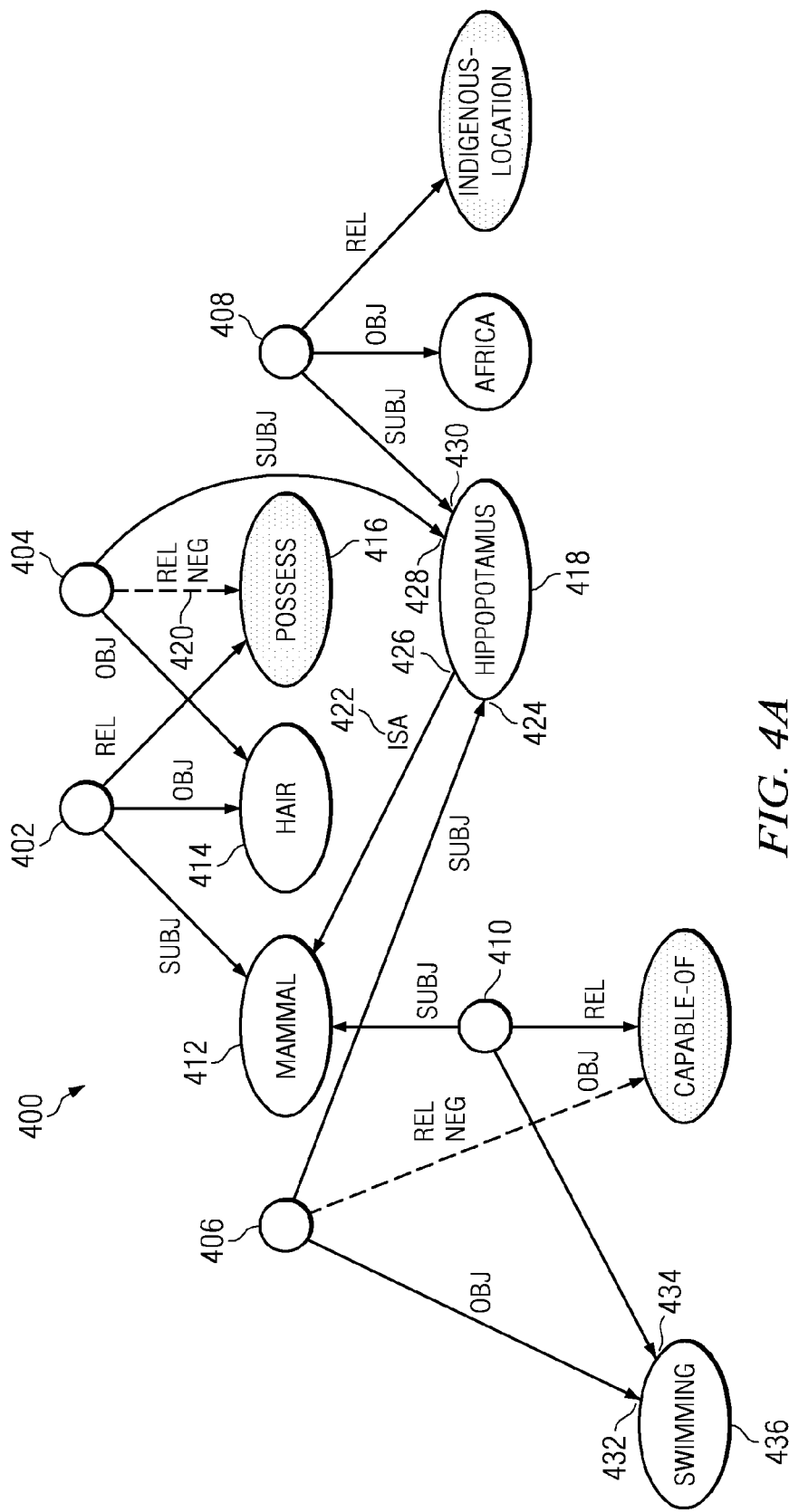
FIG. 4A is an example semantic network for a document in accordance with the illustrative embodiments.
Figure 4B:
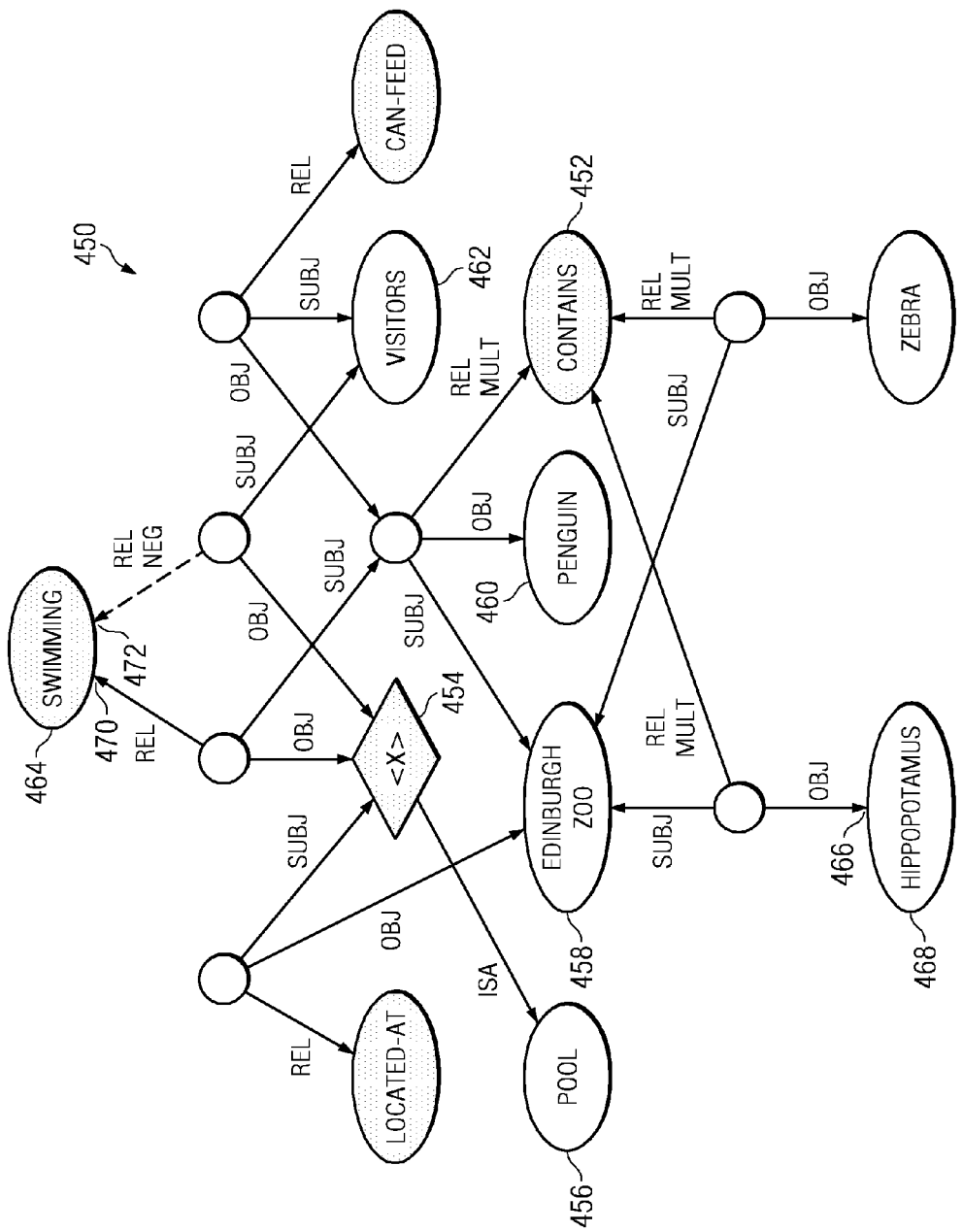
FIG. 4B is an example semantic network for a document in accordance with the illustrative embodiments.

FIGS. 4A and 4B are example semantic networks for different documents in accordance with the illustrative embodiments. Consider the simple example of a user who enters the search query, "Can a hippopotamus swim?", into a web search engine. In this particular example, two documents are identified by the web search engine as containing one or more terms in the search query. The text of the first matching document reads:

The hippopotamus, a creature indigenous to parts of Africa, is the only mammal that cannot swim. It is also the only mammal that does not have hair.

The text of the second matching document reads:

There are a number of animals in the Edinburgh zoo, including penguins, zebras, and hippopotamuses. Visitors can feed the penguins, but they cannot swim in the penguin pool.

As shown, semantic network 400 in FIG. 4A for the first matching document contains one occurrence each of the word "hippopotamus" and the word "swim". Likewise, semantic network 450 in FIG. 4B for the second matching document also contains one occurrence each of the word "hippopotamus" and the word "swim". As previously mentioned, the search engine may identify those semantic networks which contain matching terms by using a traditional search algorithm. However, using traditional search algorithms, the search engine would rank the documents as equally relevant to the search query, since both documents each contain one instance of the word "hippopotamus" and of the word "swim". The documents may also have similar number of references to each page by a page ranking algorithm, such as Google's.

In contrast, with the relevancy algorithm, the semantic networks of the two documents are further analyzed to identify which documents are more relevant to the content of the search query. The search engine may rank the relevancy of the documents based on the number of edges around the concepts (i.e., terms) in the search query. For example, semantic network 400 in FIG. 4A comprises the text of the first matching document. The dots, such as dots 402, 404, 406, 408, and 410, are used to indicate propositions, which are simple sentences. Dots 402-410 have pointers which connect subjects, relations, and objects. For instance, dot 402 indicates a proposition containing a subject ("mammal" 412), an object ("hair" 414), and the relation ("possess" 416) between mammal 412 and hair 414. Likewise, dot 404 indicates a proposition containing subject "hippopotamus" 418, object "hair" 414, and relation possess 416.

A relation may also be negative, such that the meaning of the relation is inverted. For example, the negative relation illustrated by dotted line 420 indicates that the text of the document specifies that a hippopotamus does not possess hair. "Is a" 422, or "is a", is commonly used in semantic networks to define hierarchies. For example, if nodes "rodent", "mouse", "animal", and "mammal" are in a semantic network, "is a" may be used to specify the hierarchy between the nodes, such as "a mouse is a rodent is a mammal is a animal". From the specified hierarchy, it may be understood that all the properties of a mammal apply to a mouse (i.e., possesses hair, gives birth to young live, etc.). In this particular case in FIG. 4A, "is a" 422 specifies that that "a hippopotamus is a mammal".

The relevancy algorithm analyzes semantic network 400 to determine how many edges there are around the concepts specified in the search query. With the search query, "Can a hippopotamus swim?", semantic network 400 is shown to contain an edge density of four edges 424, 426, 428, and 430 around the concept of hippopotamus 418, and an edge density of two edges 432 and 434 around the concept of swimming 436. Once the number of edges for each concept specified in the search query is known, the relevancy algorithm obtains a total relevancy score for the semantic network by adding the number of edges together to obtain a total number of edges, and then multiplying the total number of edges by the number of terms in the network. In this example, the total relevancy score for semantic network 402 is twelve (e.g., 6 total edges*2 terms=12). Thus, the more edges (connections) a term has to other nodes in the network, the more relevant the document is likely to be to the user's search query.

Semantic network 450 in FIG. 4B comprises the text of the second matching document. As shown in FIG. 4B, some relations, such as relation "contains" 452, may have multiple relationships with concepts in the semantic network. In addition, "<x>" node 454 indicates that it is a specific instance of a concept. In this illustrative example, "<x>" node 454 indicates that there is a specific pool 456 at Edinburgh Zoo 458 in which there are penguins 460 and in which visitors 462 cannot swim 464. There may be another instance of a pool at another zoo in which there are dolphins and in which people can swim, for example, and which might be noted as "<y>" or something similar.

Although semantic network 450 is more complex than semantic network 402 in FIG. 4A, using the search query, "Can a hippopotamus swim?", semantic network 450 is shown to contain an edge density of only one edge 466 around the concept of hippopotamus 468, and an edge density of only two edges 470 and 472 around the concept of swimming 464. Thus, for semantic network 450, the relevancy algorithm obtains a total relevancy score of six (e.g., 3 edges*2 terms=6). In this manner, the relevancy algorithm would rank the first matching document as a better match to the user's search query.

It should be noted that in the examples above, the search query, "Can a hippopotamus swim?", is actually answered in semantic network 402 of the first matching document. In response to such a question, a deductive reasoning algorithm may be used to provide an actual "yes" or "no" answer. However, the deductive reasoning on a semantic network required by such an algorithm is much more computationally intensive than the relevancy algorithm in the illustrative embodiments. Additionally, the relevancy algorithm may still be useful with more generic search strings. For example, instead of a search comprising a question such as "Can a hippopotamus swim?", a generic search query may merely comprise the terms, "hippopotamus swim". In this generic search string situation, the relevancy algorithm would be able to determine the relevancy of a document to the search terms provided, while the deductive reasoning algorithm would have nothing to deduce.

FIG. 5 is a flowchart of a process for establishing document relevance by semantic network density in accordance with the illustrative embodiments. The process begins with receiving a search query from a user (step 502). When the search query is received, the relevancy algorithm first searches the semantic networks in a repository to locate documents which contain one or more terms which match the terms in the search query (step 504). Upon obtaining the semantic networks for the list of documents which match one or more terms in the search query, the relevancy algorithm scores the relevancy of each semantic network to the search query by calculating the edge density of each node corresponding to a search term (step 506). The relevancy algorithm may calculate a total relevancy score for each semantic network based on the total number of edges (i.e., relationship connections) incident to the relevant nodes (i.e., concepts) multiplied by the number of matching terms in the network. In other words, semantic networks that have a significant amount of context around the terms specified in the search query are more likely to be relevant to the query.

A determination is then made as to whether any of the documents in the list contains multiple semantic networks (step 508). If a document does not contain more than one semantic network ('no' output to step 508), the process skips to step 512. If a document contains more than one semantic network ('yes' output to step 508), the scores for each of the semantic networks are added together to form the relevancy score for the document (step 510). The semantic networks having a higher edge density are ranked as better matches to the search query (step 512). The list of documents corresponding to the ranked semantic networks are then provided to the user in such a manner as to indicate the relevancy ranking (step 514), with the process terminating thereafter.

Figure 6:
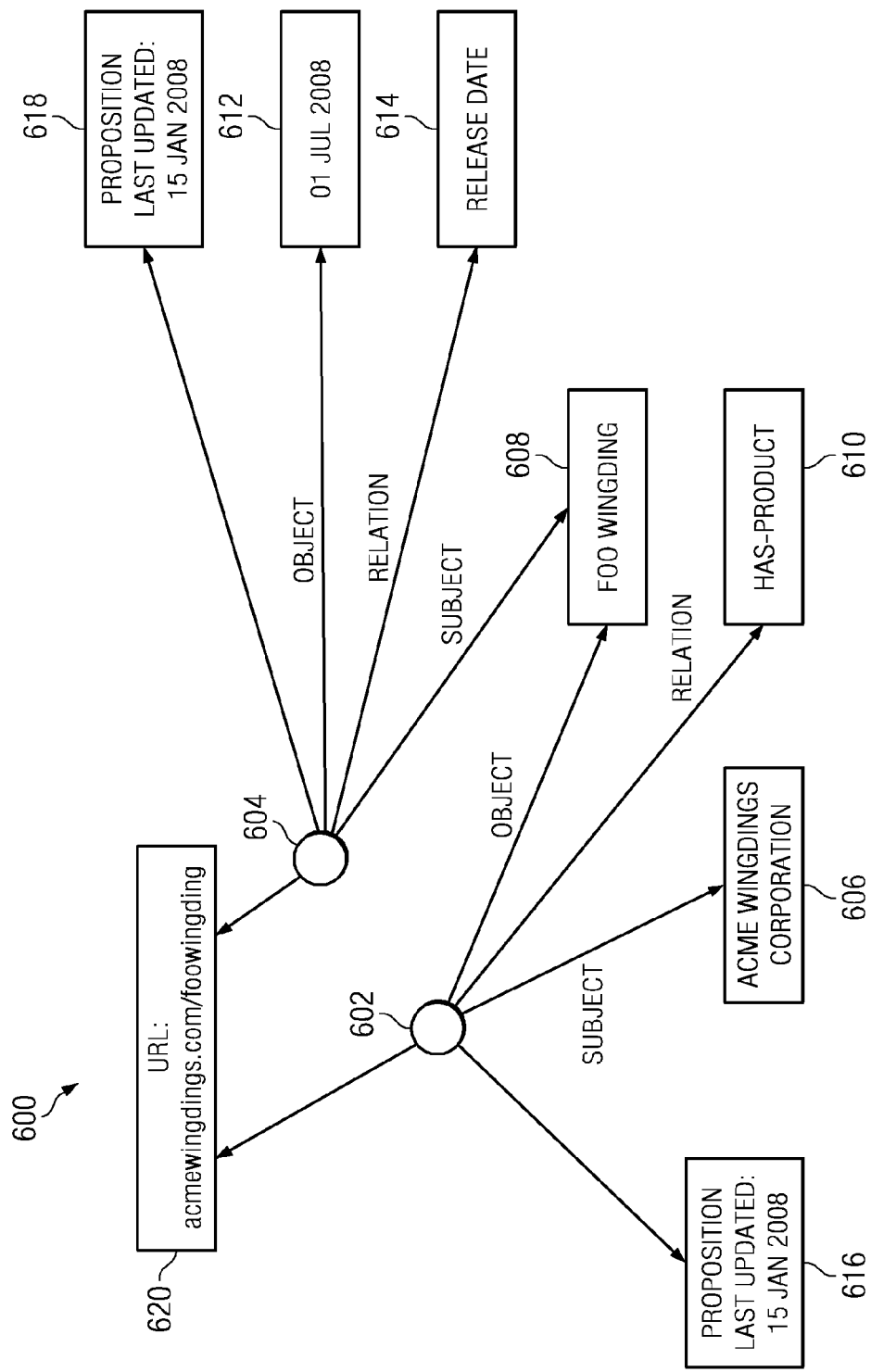
FIG. 6 is an example semantic network in accordance with the illustrative embodiments.

FIG. 6 is an example semantic network in accordance with the annotation mechanism in the illustrative embodiments. Although the annotation mechanism is described herein using a particular example of a corporation that markets a new product, it should be noted that the annotation mechanism may be used to determine the veracity of other types of data stored in a repository as well.

In this illustrative example, a corporation, Acme Wingdings Corporation, announces a new product called "Foo Wingding" on January 15$^{th}$. The January 15$^{th}$ announcement indicates that the product will be released to the public on July 1$^{st}$. The corporation updates the corporate website with this release date information. A search engine (such as search engine 316 in FIG. 3) then crawls the corporate website, indexes the data obtained from the website, and builds semantic network 600 with the website data. Any known method of generating semantic networks may be used to implement the illustrative embodiments. A semantic network breaks the data in a document into component propositions, which makes it easier to mark a part of the document as obsolete, while allowing the remaining portions of the document to be considered still up-to-date. The semantic networks in the repository may be either created and stored statically, or created dynamically in response to receiving a search request from a user.

As shown in FIG. 6, the data from the corporate website is separated in the semantic network into component propositions, or simple sentences. Dots 602 and 604 are used to indicate example propositions. Dots 602 and 604 have pointers which connect subjects, relations, and objects. For instance, dot 602 indicates a proposition containing a subject ("Acme Wingdings Corporation" 606), an object ("Foo Wingding" 608), and the relation ("has-product" 610), while dot 604 indicates a proposition containing a subject ("Foo Wingding" 608), an object ("1 Jul. 2008" 612), and the relation ("release date" 614). Dots 602 and 604 also point to metadata about each proposition, such as the update information (15 Jan. 2008) (616 and 618) and the Uniform Resource Locator (URL) (620) for both of the propositions. A user's search of the semantic network for "Foo Wingding release date" at this point may return a result of the July 1$^{st}$ release date 612 with a pointer to the corporation website 620.

Figure 7:
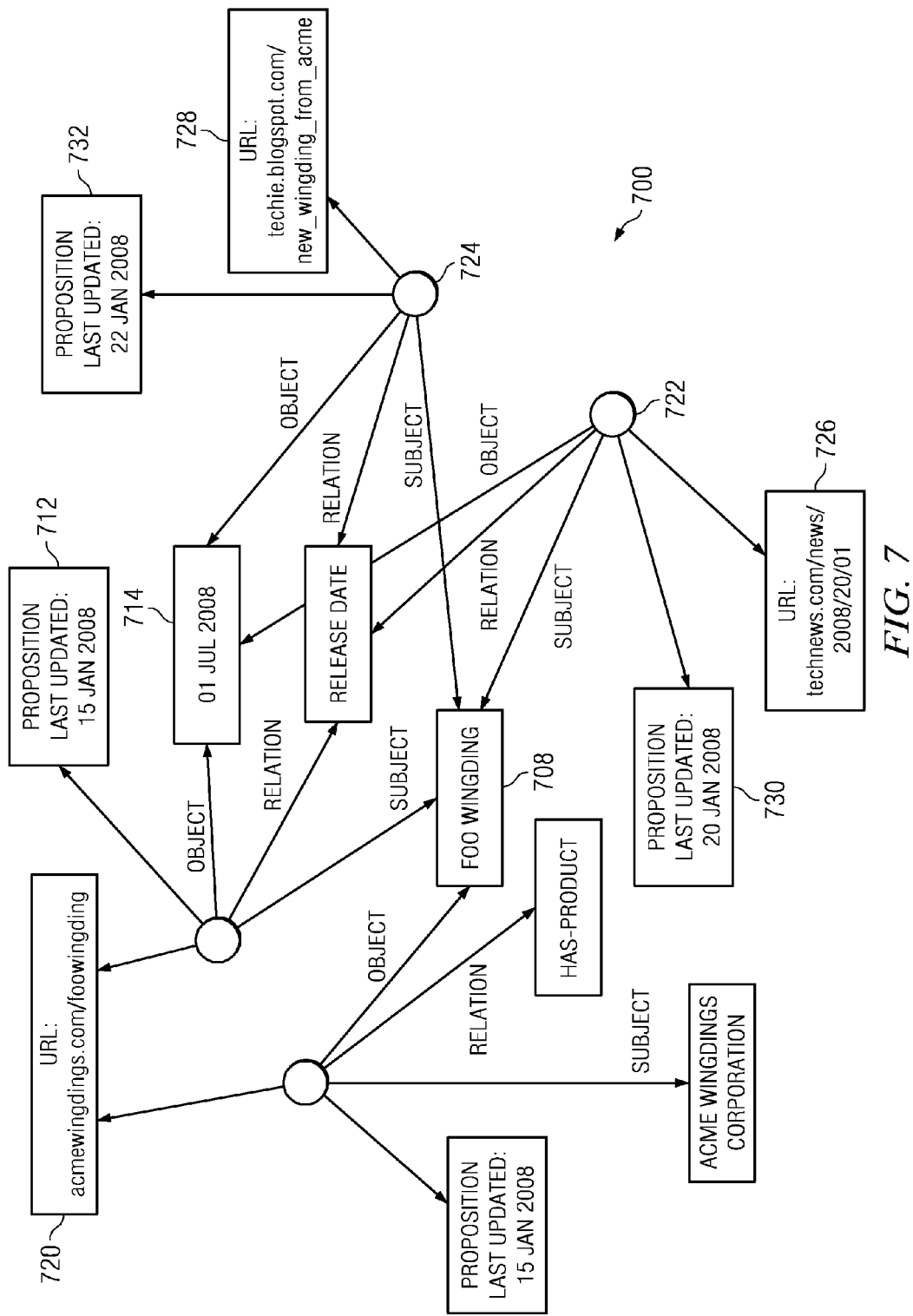
FIG. 7 is an example semantic network in accordance with the illustrative embodiments.

FIG. 7 is another example semantic network in accordance with the illustrative embodiments. FIG. 7 illustrates how a semantic network may be updated as new websites are created and processed by the search engine. For instance, subsequent to the creation of semantic network 600 in FIG. 6, a number of Internet-based technical journals, blogs, and forums begin to discuss the upcoming product on their websites. These sources discuss the merits of the Foo Wingding product and mention the July 1$^{st}$ release date on their websites. When search engine 316 in FIG. 3 crawls and indexes these new articles and posts, the search engine updates its semantic network accordingly. FIG. 7 illustrates what a small portion of the resulting semantic network may look like.

In this particular example, updated semantic network 700 includes dots 722 and 724 which represent new propositions added to the previous semantic network. Dot 722 comprises pointers to data obtained from an article 726 that mentions the product 708 and the July 1$^{st}$ 712 release date 714. Dot 724 comprises pointers to data obtained from a blog entry 728 that also mentions the product 708 and the July 1$^{st}$ 712 release date 714. Dots 722 and 724 also point to metadata about each proposition, such as the update information (730 and 732) for each proposition. A user search of updated semantic network 700 for "Foo Wingding release date" at this point will continue to return a result of the July 1$^{st}$ release date 714 with pointers to the Acme Wingdings Corporation website 720 and the various journal articles 726 and posts 714.

Figure 8:
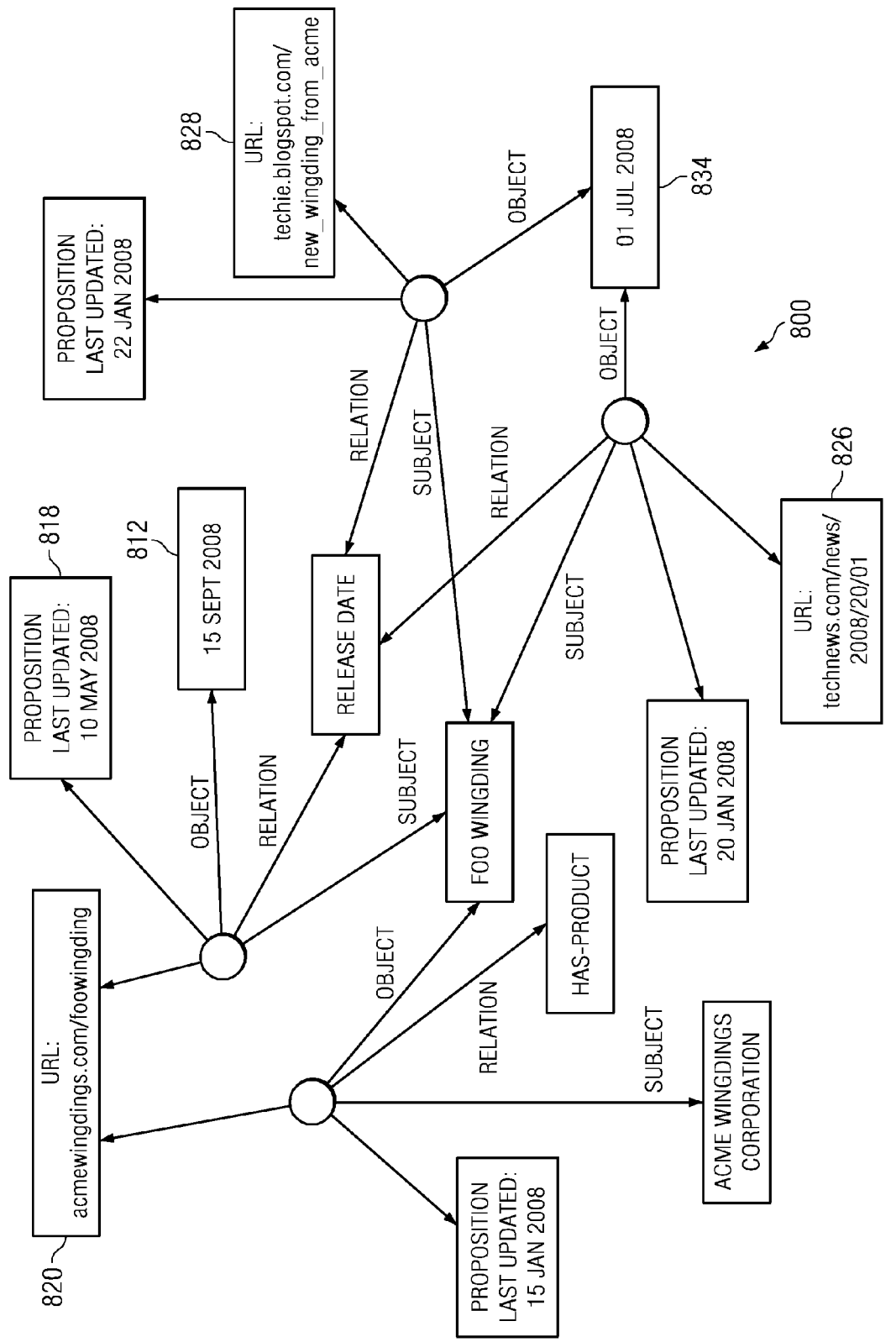
FIG. 8 is an example semantic network in accordance with the illustrative embodiments.

FIG. 8 is another example semantic network in accordance with the illustrative embodiments. FIG. 8 illustrates how the semantic network may be updated as new, conflicting information is processed by the search engine. For instance, subsequent to the creation of updated semantic network 700 in FIG. 7, the Acme Wingdings Corporation experiences supply and technical issues and decides to delay the release of the product. On May 10, the corporation issues a new release date of September 15th. The corporation also updates the corporation website with this new release date information.

When the search engine processes the new release date information, the search engine updates its semantic network accordingly. FIG. 8 illustrates an example of the resulting semantic network. Updated semantic network 800 includes the updated release date 812 (15 Sep. 2008) on the Acme Wingdings Corporation website, as well as the updated proposition update metadata 818 (10 May 2008) for the website. With existing search mechanisms, a user search for the product will include web page documents that contain the original release date of the product, without providing any indication in these returned documents that the release date has changed. Thus, the user may be presented with erroneous information. In contrast, the annotation mechanism in the illustrative embodiments identifies obsolete data within a web page document, annotates the document with up-to-date information to override the obsolete data in the document, and returns the annotated document in the search results to the user. Thus, when a user clicks on the annotated document, the obsolete data is annotated in the document with up-to-date data also obtained from the repository. When a document comprises data whose veracity is in question due to the existence of conflicting data in other documents within the repository, a "trustworthiness" algorithm is used to dictate which data source contains the correct or most reliable data. Any data that is deemed to be incorrect or unreliable on the displayed web page is annotated automatically. In an alternative embodiment, rather than determining which data is correct via a trustworthiness algorithm, a link may be provided in the annotation which provides a summary of all the conflicting data, along with sources of the conflicting data. In this case, users may determine for themselves which data source is most reliable.

The trustworthiness algorithm may identify obsolete data using one or more factors for determining whether there is more accurate data in the repository. These factors may include, for example, the age of the data, whether the data has been superseded by more recent data, the frequency of searches for that proposition, etc. For instance, when a document is about to be displayed to a user, a check is performed on each proposition in the document to determine if other propositions in the semantic network contain contradictory information. In this particular example, if the document from blog website 828 is being displayed, a determination is made when the "Foo Wingding release date 1 Jul. 2008" 834 is processed that there is another "Foo Wingding release date" proposition with a different object ("Foo Wingding release date 15 Sep. 2008" 812). Thus, release date 812 conflicts with release date 834 indicated on the journal article and blog websites. The trustworthiness algorithm may then be used to determine which of the propositions is more accurate. In this example, the trustworthiness algorithm may determine that release date 812 indicated on the Acme Wingdings Corporation website has been more recently updated (10 May 2008) than release dates 834 indicated on the journal article and blog websites, which were updated Jan. 1, 2008 and Jan. 22, 2008, respectively. Since release date 812 on the Acme Wingdings Corporation website was updated more recently than release date 834 on the journal article and blog websites, the trustworthiness algorithm determines that the release date 812 is more accurate. Consequently, release date 834 is determined to comprise obsolete data. It should be noted that while this particular example illustrates the metric for "trustworthiness" may comprise a simple algorithm—the more recently updated website is determined to contain the correct information—more complex algorithms for relative trustworthiness may be used to determine the veracity of the data in the repository as well.

Once obsolete data in the repository is identified, the annotation mechanism indicates to a user that the identified data is obsolete by annotating the identified data with up-to-date data obtained from within the same repository. For instance, a user search of the product will still return a search result list comprising the journal and blog websites (e.g., 826 and 828) that specify the out-of-date release date information. However, since there is superseding data in the repository that contains the more recent release date information, the documents in the search results that contain the incorrect release date are automatically annotated to indicate that there is a new release date. Thus, a user search of updated semantic network 800 for "Foo Wingding release date" will include a result set comprising the correct September 15th release date 812 with pointers to the corporation website 820. The result set will also comprise the July 1$^{st}$ release date 834 with pointers to the article website 826 and blog website 828. However, the July 1$^{st}$ release date on the article website 826 and blog website 828 will also be annotated with the correct release date of September 15$^{th}$, as further illustrated in FIG. 9.

Figure 9:
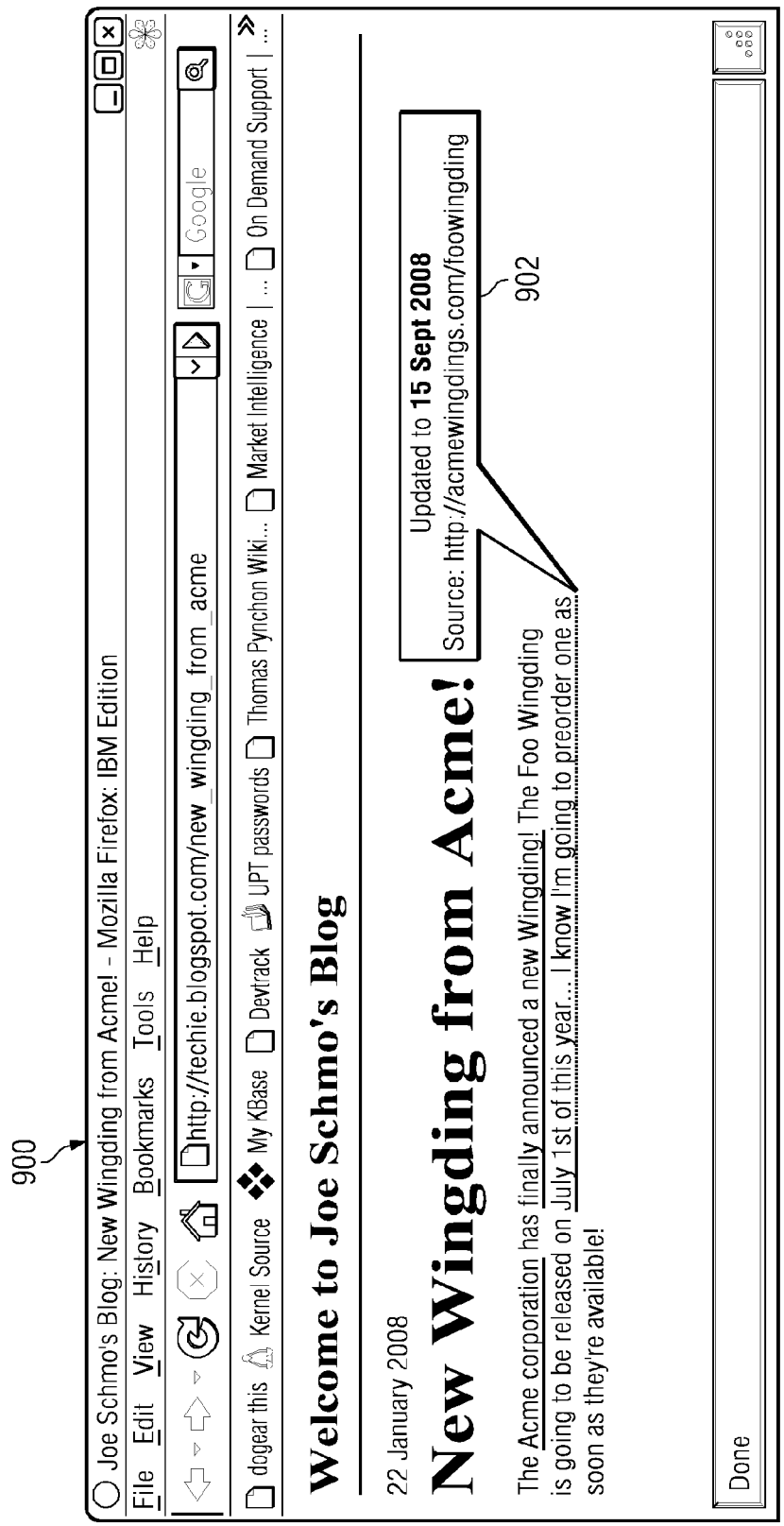
FIG. 9 is an example annotated web page in accordance with the illustrative embodiments.

FIG. 9 is an example annotated web page in accordance with the illustrative embodiments. When a user performs a search of a semantic network, such as updated semantic network 800 in FIG. 8, the user is presented with a list of search results. In this example, a link to the URL for blog website 828 in FIG. 8 is returned in the result set. If a user clicks on the URL link for the blog website that contains an older, incorrect release date, an annotated version of the website (web page 900) is displayed to the user. Annotated web page 900 comprises the information about the product announcement and the release date. However, the information within the original blog website contains obsolete data, as the blog specifies the incorrect product release date of July 1$^{st}$. The annotation mechanism of the illustrative embodiments automatically annotates the obsolete portion of data on the website (e.g., annotation 902) to specify the correct product release date of September 15$^{th}$. In one embodiment, the web page may be annotated by having the search engine inject markup (e.g., Javascript) into the served page in order to make a visible annotation (with reference) without modifying the underlying information on the website. As portions of web page 900 still contain accurate and up-to-date information, only the obsolete data identified in the web page is annotated with the updated information.

In an alternative embodiment, the annotation of a document containing obsolete data may be performed whenever the website is visited by a user. For instance, a user may configure the user's system to reference a semantic network (or similar back-end repository) whenever the website is accessed to determine if there are any updates to the information in that website. If any information is determined to be obsolete, the presentation of the website may be updated on the fly with annotations indicating the new information. This implementation may be partially realized using, for example, Greasemonkey for the Firefox browser to inject Javascript into the served page. A network administrator may similarly annotate websites that are served through a proxy server. This functionality may be limited to an intranet (or some other subset of websites) to provide value to users of a corporate intranet.

Figure 10:
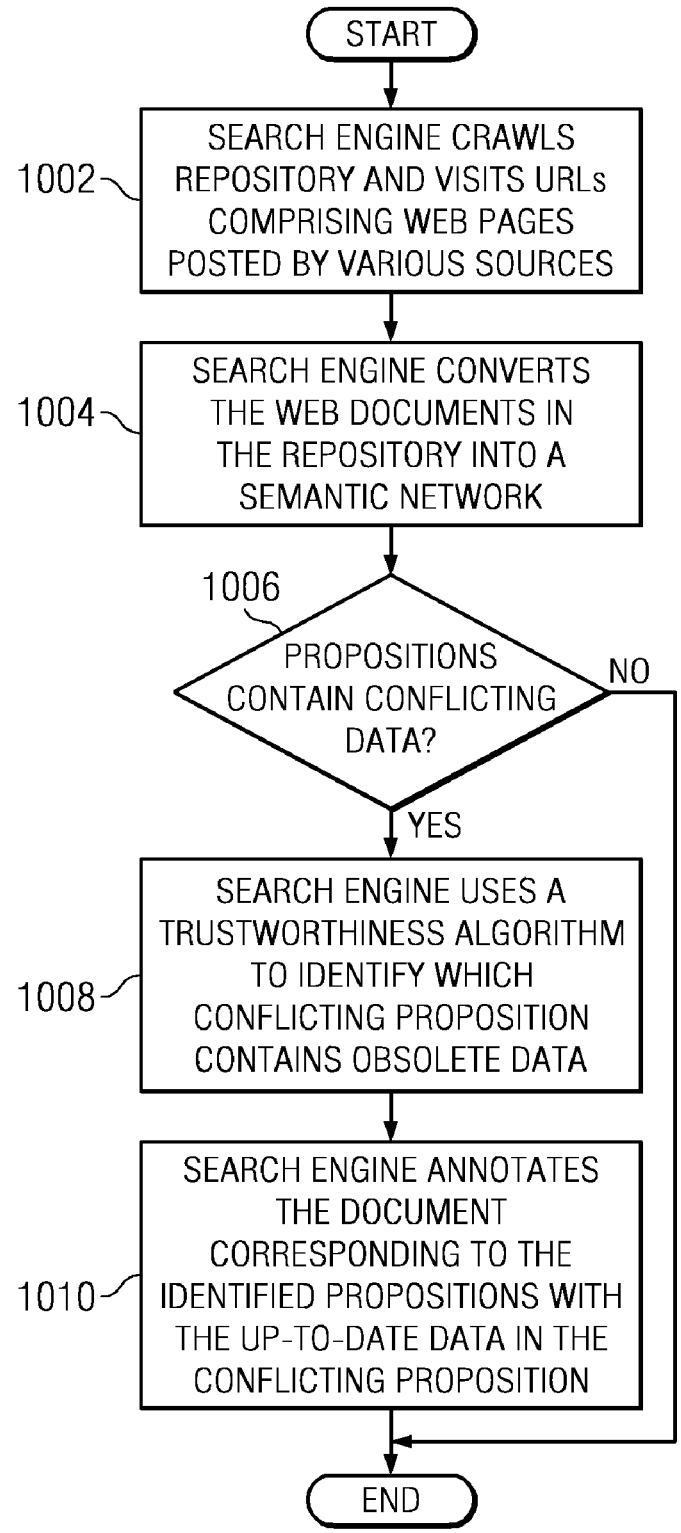
FIG. 10 is a flowchart of a process for determining the veracity of data in a repository in accordance with the illustrative embodiments.

FIG. 10 is a flowchart of a process for determining the veracity of data in a repository in accordance with the illustrative embodiments. The process begins with the search engine crawling a repository and visiting the URLs comprising web pages posted by various sources (step 1002). The repository may be the web or a private database. In response to receiving a search request from a user, the search engine then converts the documents in the repository into a semantic network (step 1004), wherein the semantic network comprises propositions matching one or more terms in the search query. The search engine may create and store the semantic networks statically or, alternatively, create the semantic networks dynamically in response to receiving a user search request.

A determination is then made as to whether any of the propositions in the semantic network contain data that conflicts with other propositions in the network (step 1006). In a simple embodiment, this determination may be made by comparing each proposition in a document that is about to be displayed to a user to identify the propositions that satisfy a matching threshold. For instance, if the subject and the relation of a proposition match the subject and relation of any other proposition in the document (i.e., a minimum matching threshold), the objects associated with the matching subject and relations are checked to determine if the objects comprise conflicting information. While an example of a proposition comprising a subject, relation, and object is described above, it should also be noted that the embodiment above is used merely to describe a simplistic representation of a semantic network, and that propositions in a semantic network may comprise various additional node and relation types, including subject, object, relation (verb), complement, adverbial, etc.

If the propositions contain no conflicting data ('no' output of step 1006), the process terminates thereafter. However, if any of the propositions contain conflicting data ('yes' output of step 1006), the search engine may use a trustworthiness algorithm to determine which of the conflicting propositions is no longer useful or obsolete (step 1008). In determining which of the conflicting proposition contains more recent (accurate) data which of the conflicting proposition contains obsolete data, the trustworthiness algorithm may compare the age of the data in one proposition against the age of the data in the other proposition, determine whether the data in one proposition is superseded by more recent data in the other proposition, compare the frequency of searches for one proposition against the frequency of searches of the other proposition, compare the trustworthiness of the information sources, compare the relative popularity of the objects, among others.

Once the search engine has identified a proposition in the semantic network that contains obsolete data, the search engine annotates the portion of the document containing the identified proposition with the up-to-date data found in the conflicting proposition in the repository (step 1010). The annotation may include eliminating or overwriting the obsolete portion of the document with the up-to-date data.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for determining veracity of data in documents stored in a repository, the computer implemented method comprising:
    creating one or more semantic networks from the documents in the repository, wherein said one or more semantic networks define intra-document and inter-document relationships among terms contained within the documents;
    responsive to receiving a search query, identifying one or more semantic networks containing nodes matching one or more terms in the search query;
    determining an edge density for each node matching a term in the search query;
    calculating a relevancy score for each of the one or more semantic networks based on the edge densities of the nodes matching a term in the search query;
    determining a relevancy, to the search query, of a first document associated with the one or more semantic networks based on the relevancy score;
    determining if data from the first document in one of the semantic networks conflicts with data from a second document in one of the semantic networks;
    responsive to a determination that data from the first document conflicts with data from the second document, determining whether the conflicting data from the first document is obsolete in comparison to data from the second document;
    wherein determining if the data from the first document is obsolete further comprises:
        comparing search frequency information for the data from the first document against search frequency information for the data from the second document; and
        responsive to a determination that the search frequency information for the data from the second document is higher than the search frequency information for the data from the first document, determining that the data from the first document is obsolete in comparison with the data from the second document;
    responsive to a determination that the conflicting data from the first document is obsolete in comparison to data from the second document, annotating a portion of the first document corresponding to the obsolete data with the data from the second document to form an annotated first document; and
    providing a search result list to the user comprising the second document and the annotated first document.

2. The computer implemented method of claim 1, further comprising:
    responsive to a user selecting a link to the annotated first document in the search result list, displaying the annotated first document, wherein the annotated first document comprises the obsolete data and the data from the second document, and wherein an annotation in the first document indicates on the displayed first document that the data from the second document overrides the obsolete data in the first document.

3. The computer implemented method of claim 1, wherein determining if the data from the first document is obsolete further comprises:
    comparing update information for the data from the first document against update information for the data from the second document; and
    responsive to a determination that the update information for the data from the second document is more recent than the update information for the data from the first document, determining that the data from the first document is obsolete in comparison with the data from the second document.

4. The computer implemented method of claim 1, wherein annotating a portion of the first document corresponding to the obsolete data with the data from the second document to form an annotated first document further comprises:
    responsive to serving the first document to the user, injecting markup into the first document to annotate the portion of the first document.

5. The computer implemented method of claim 4, wherein the markup is injected into the first document to annotate the obsolete data in the portion of the first document without modifying remaining portions of the first document.

6. The computer implemented method of claim 1, further comprising:
    providing a link in the annotated first document, wherein the link displays a summary of conflicting data in the documents and sources of the conflicting data.

7. The computer implemented method of claim 1, wherein determining if data from a first document in the semantic network conflicts with data from a second document in the semantic network further comprises:
    comparing propositions in the semantic network to identify propositions that satisfy a matching threshold; and
    determining at least one of the nodes in a matched proposition conflicts with a corresponding node in another of the matched propositions.

8. The computer implemented method of claim 1, wherein annotating the first document further comprises removing the obsolete data in the first document.

9. A non-transitory computer readable storage medium having stored thereon computer-executable instructions for determining veracity of data in documents stored in a repository, said computer-executable instructions performing a method comprising:
    creating one or more semantic networks from the documents in the repository, wherein said one or more semantic networks define intra-document and inter-document relationships among terms contained within the documents;
    responsive to receiving a search query, identifying one or more semantic networks containing nodes matching one or more terms in the search query;
    determining an edge density for each node matching a term in the search query;

calculating a relevancy score for each of the one or more semantic networks based on the edge densities of the nodes matching a term in the search query;

determining a relevancy, to the search query, of a first document associated with the one or more semantic networks based on the relevancy score;

determining if data from the first document in one of the semantic networks conflicts with data from a second document in one of the semantic networks;

determining, in response to a determination that data from the first document conflicts with data from the second document, whether the conflicting data from the first document is obsolete in comparison to data from the second document;

wherein said determining if the data from the first document is obsolete further comprises:

comparing search frequency information for the data from the first document against search frequency information for the data from the second document; and determining, in response to a determination that the search frequency information for the data from the second document is higher than the search frequency information for the data from the first document, that the data from the first document is obsolete in comparison with the data from the second first document;

annotating, in response to a determination that the conflicting data from the first document is obsolete in comparison to data from the second document, a portion of the first document corresponding to the obsolete data with the data from the second document to form an annotated first document; and providing a search result list to the user comprising the second document and the annotated first document.

10. The non-transitory computer readable storage medium of claim 9, further comprising:

displaying the annotated first document in response to the user selecting a link to the annotated first document in the search result list, wherein the annotated first document comprises the obsolete data and the data from the second document, and wherein an annotation in the first document indicates on the displayed first document that the data from the second document overrides the obsolete data in the first document.

11. The non-transitory computer readable storage medium of claim 9, wherein said determining if the data from the first document is obsolete further comprises:

comparing update information for the data from the first document against update information for the data from the second document; and determining, in response to a determination that the update information for the data from the second document is more recent than the update information for the data from the first document, that the data from the first document is obsolete in comparison with the data from the second document.

12. The non-transitory computer readable storage medium of claim 9, wherein said annotating a portion of the first document corresponding to the obsolete data with the data from the second document to form an annotated first document further comprises:

injecting markup into the first document to annotate the portion of the first document in response to serving the first document to the user.

13. The non-transitory computer readable storage medium of claim 12, wherein the markup is injected into the first document to annotate the obsolete data in the portion of the first document without modifying remaining portions of the first document.

14. The non-transitory computer readable storage medium of claim 9, wherein said method further comprises:

providing a link in the annotated first document, wherein the link displays a summary of conflicting data in the documents and sources of the conflicting data.

15. The non-transitory computer readable storage medium of claim 9, wherein said determining if data from a first document in the semantic network conflicts with data from a second document in the semantic network further comprises:

comparing propositions in the semantic network to identify propositions that satisfy a matching threshold; and determining at least one of the nodes in a matched proposition conflicts with a corresponding node in another of the matched propositions.

\* \* \* \* \*